United States Patent [19]

Yamaguchi et al.

[11] Patent Number: 4,954,968
[45] Date of Patent: Sep. 4, 1990

[54] INTERFACE SYSTEM FOR PRINT SYSTEM

[75] Inventors: Ikunori Yamaguchi; Kiyoshi Emori; Takashi Morikawa, all of Osaka, Japan

[73] Assignee: Minolta Camera Kabushiki Kaisha, Osaka, Japan

[21] Appl. No.: 322,933

[22] Filed: Mar. 15, 1989

[30] Foreign Application Priority Data

Mar. 16, 1988 [JP] Japan .................................. 63-62244
Mar. 17, 1988 [JP] Japan .................................. 63-64886

[51] Int. Cl.⁵ .............................................. G06F 7/00
[52] U.S. Cl. ...................................... 364/519; 364/518
[58] Field of Search ............................. 364/518-523, 364/200 MS File, 900 MS File; 346/154; 358/296

[56] References Cited

U.S. PATENT DOCUMENTS 4,644,319  2/1987  Yamaguchi ....................... 364/519
4,694,405  9/1987  Bradbury et al. ................. 364/519
4,811,242  3/1989  Adachi ............................... 364/519
4,879,666 11/1989  Kembo ............................... 364/519

FOREIGN PATENT DOCUMENTS 61-113089  5/1986  Japan ................................ 364/519
61-148487  7/1986  Japan ................................ 364/519

Primary Examiner—Arthur G. Evans
Attorney, Agent, or Firm—Burns, Doane, Swecker & Mathis

[57] ABSTRACT

An interface system for receiving from a host computer a series of dot data as print information, and converting the received data to dot information and for providing the same to a printing system. The interface system has a pseudofont memory in which dot information is stored as column vectors obtained by matrix-transposing row vectors of several series of dot data in advance and a bit map memory in which dot information corresponding to the received serial dot data is stored. For a printing operation, the dot information in the bit map memory is transferred therefrom in a page-by-page unit.

31 Claims, 12 Drawing Sheets

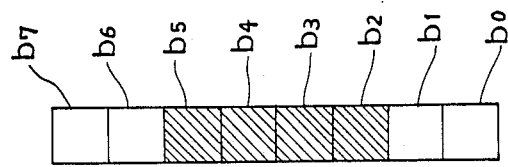
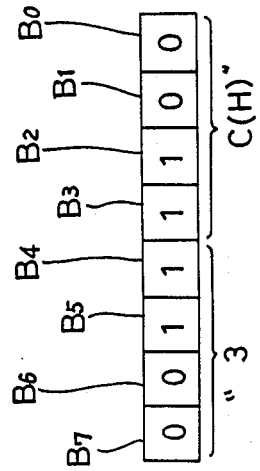
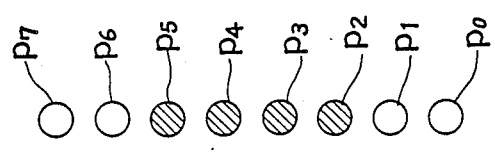

FIG 8a
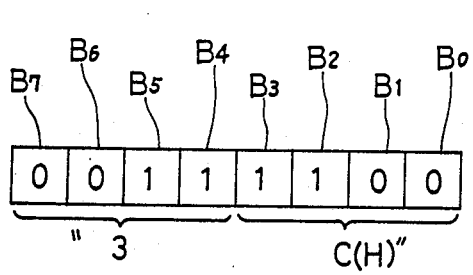
FIG. 8b
FIG. 8c
FIG. 9
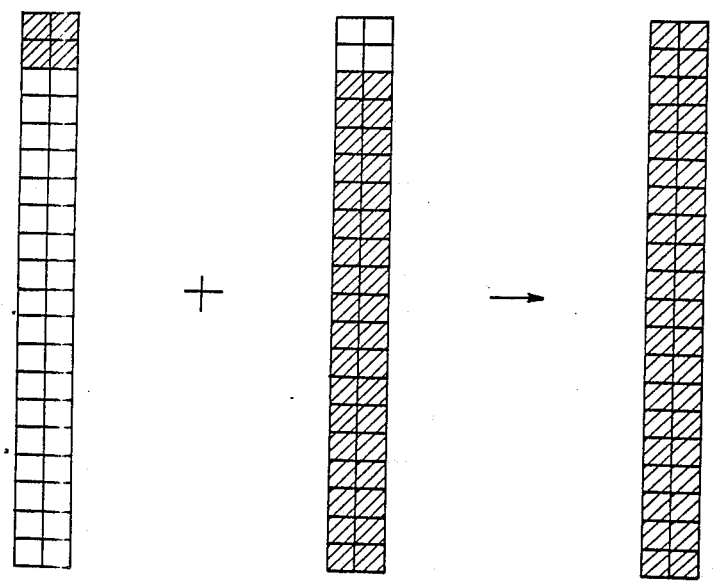

FIG. 13

| | 4 MSB'S OF INPUTTED SERIAL DATA (HEXADECIMAL) | | | | | | | | | | | | | | | |
|---|---|---|---|---|---|---|---|---|---|---|---|---|---|---|---|---|
| | | 0 | 1 | 2 | 3 | 4 | 5 | 6 | 7 | 8 | 9 | A | B | C | D | E | F |
| 4 LSB'S OF INPUTTED SERIAL DATA | 0 | 20 | 30 | 40 | 50 | 60 | 70 | 80 | 90 | A0 | B0 | C0 | D0 | E0 | F0 | A0+80 | A0+90 |
| | 1 | 21 | 31 | 41 | 51 | 61 | 71 | 81 | 91 | A1 | B1 | C1 | D1 | E1 | F1 | A0+81 | A0+91 |
| | 2 | 22 | 32 | 42 | 52 | 62 | 72 | 82 | 92 | A2 | B2 | C2 | D2 | E2 | F2 | A0+82 | A0+92 |
| | 3 | 23 | 33 | 43 | 53 | 63 | 73 | 83 | 93 | A3 | B3 | C3 | D3 | E3 | F3 | A0+83 | A0+93 |
| | 4 | 24 | 34 | 44 | 54 | 64 | 74 | 84 | 94 | A4 | B4 | C4 | D4 | E4 | F4 | A0+84 | A0+94 |
| | 5 | 25 | 35 | 45 | 55 | 65 | 75 | 85 | 95 | A5 | B5 | C5 | D5 | E5 | F5 | A0+85 | A0+95 |
| | 6 | 26 | 36 | 46 | 56 | 66 | 76 | 86 | 96 | A6 | B6 | C6 | D6 | E6 | F6 | A0+86 | A0+96 |
| | 7 | 27 | 37 | 47 | 57 | 67 | 77 | 87 | 97 | A7 | B7 | C7 | D7 | E7 | F7 | A0+87 | A0+97 |
| | 8 | 28 | 38 | 48 | 58 | 68 | 78 | 88 | 98 | A8 | B8 | C8 | D8 | E8 | F8 | A0+88 | A0+98 |
| | 9 | 29 | 39 | 49 | 59 | 69 | 79 | 89 | 99 | A9 | B9 | C9 | D9 | E9 | F9 | A0+89 | A0+99 |
| | A | 2A | 3A | 4A | 5A | 6A | 7A | 8A | 9A | AA | BA | CA | DA | EA | FA | A0+8A | A0+9A |
| | B | 2B | 3B | 4B | 5B | 6B | 7B | 8B | 9B | AB | BB | CB | DB | EB | FB | A0+8B | A0+9B |
| | C | 2C | 3C | 4C | 5C | 6C | 7C | 8C | 9C | AC | BC | CC | DC | EC | FC | A0+8C | A0+9C |
| | D | 2D | 3D | 4D | 5D | 6D | 7D | 8D | 9D | AD | BD | CD | DD | ED | FD | A0+8D | A0+9D |
| | E | 2E | 3E | 4E | 5E | 6E | 7E | 8E | 9E | AE | BE | CE | DE | EE | FE | A0+8E | A0+9E |
| | F | 2F | 3F | 4F | 5F | 6F | 7F | 8F | 9F | AF | BF | CF | DF | EF | FF | A0+8F | A0+9F |

INTERFACE SYSTEM FOR PRINT SYSTEM

BACKGROUND OF THE INVENTION

1. Field of the Invention

The present invention relates to an interface system for use in a printer system such as a laser beam printer for recording information transferred from a host computer or the like on a recording medium such as a recording sheet, and more particularly to an interface system for use in a so-called page printer capable of printing, e.g., one page information at a time with help of a recording device having a predetermined storage capacity commonly referred to as a bit map memory with a facilitated editing feature. Incidentally, in the present specification, in addition to the above-described page printer capable of printing one page of information at a time, other types of printers adapted for printing a half page or a plurality of pages of information at a time will be generically referred to as the page printer.

2. Related Arts of the Invention

The recording information provided by the host computer to the page printer is generally transferred as serial data via a single signal line. If the recording information comprises character codes representing character information to be recorded, font data in the form of a bit map for each character code is retreaved from a font memory to be written into a determination storage area on the bit map memory and this data retreaval-write operation is repeated. On the other hand, if the recording information comprises graphic image data representing graphic image information directly corresponding to a bit map to be recorded, raster image data transmitted as serial data in correspondance to the graphic image data is successively written from a starting storage area of the bit map memory.

Incidentally, as a printer for recording information such as character information or graphic image information on a recording medium, an impact type wire-dot printer is widely used. This wire-dot impact printer has a recording head including a plurality of vertically aligned wire pins. In operation, as this recording head is moved laterally, the wire pins selected in accordance with the recording information strike an ink ribbon against a recording medium thereby printing an image thereon. Accordingly, when this wire-dot impact printer as an output terminal device receives from a host computer recording information directly corresponding to a bit map to be recorded, the recording information is transferred as serial data consisting of a plurality of bits corresponding to the number of the wire pins re-arranged in the lateral alignment.

That is to say, a conventional recording system must include a specific combination of host computer and a printer as an output terminal device therefor because of the difference in the protocol of the recording information communicated therebetween.

However, the page printer represented by the increasingly popular laser printer has the advantages of high speed and high resolution image recording and also of low noise generation. Then, there has been a demand for using the laser beam printer in place of the wire-dot printer in a conventional recording system by sharing the same host computer in order to achieve high recording efficiency and high quality recording image.

Then, in order to use the page printer such as the laser printer in the conventional recording system, because of the aforementioned difference between the protocols of the recording information provided from the host computer to the impact printer and to the page printer, it becomes necessary to convert the recording information adapted for the wire-dot printer into serial data suited for the page printer.

One conceivable means to overcome the above problem is to provide a hardware interface. In this case, even if the system is to be adapted for a single protocol, the addition of the hardware will bring about a cost increase. Further, if the system is to be adapted for a plurality of different protocols, this will make the system significantly complicated and costly. Accordingly, in order for the system to commonly use the page printer without incurring cost increase and with adaptability for many different types of protocols, it becomes necessary to provide a protocol-converting emulation software which enables the system to process data under various protocols only through minor changes in the data processing.

Moreover, as described hereinbefore, the page printer such as the laser beam printer generally has a higher recording resolution than the wire-dot impact printer. Accordingly, if this page printer is used in place of the wire-dot impact printer only by dot-by-dot corresponding the data for the wire-dot impact printer, the page printer will provide the recording information only in a physically reduced scale.

For the above reason, even with the protocol-converting emulation software, if there exists the problem of resolution difference as described above, an additional processing becomes necessary for enlarging the protocol-converted data. Such additional processing necessitates an undesirable delay in the recording speed of the system.

SUMMARY OF THE INVENTION

In view of the above-described state of the art, the primary object of the present invention is to provide an interface system for enabling a conventional recording system adapted for a wire-dot impact printer to commonly use a page printer without incurring cost disadvantages.

A further object of the present invention is to provide a printer capable of readily obtaining a recording image of substantially same size without slow-down in recording speed thereof even when the printer is used as a substitute for a wire-dot impact printer with a relatively lower resolution performance.

In order to accomplish the above-noted objects, in an interface system for receiving from a host computer a series of dot data as print information, and converting the received data to dot information and for providing the same to a printing system, the interface system of the invention comprises: first memory means for storing dot information as column vectors obtained by matrix-transposing row vectors of several series of dot data in advance; second memory means for storing dot information to be printed over a predetermined print area; management means for accessing the first memory means to store in the second memory means dot information corresponding to the received dot data; and output means for outputting the dot information stored in the second memory means in a predetermined order.

Further, according to one alternate embodiment of the present invention, the interface system comprising: a font memory for storing dot information as dot patterns in accordance with a plurality of characters represented by character codes in advance; a pseudofont memory for storing dot information as column vectors obtained by matrix-transposing row vectors of several series of dot data in advance; judging means for distinguishing between the character codes and the series of dot data; a bit map memory for storing dot information to be printed over a predetermined print area; management means for accessing the font memory and retreaving therefrom the dot information corresponding to the character codes and writing the same in the bit map memory when the judging means detects the character codes while accessing the pseudofont memory and retreaving therefrom the dot information corresponding to the series of dot data and writing the same in the bit map memory when the judging means detects the series of dot data; and output means for outputting the dot information stored in the bit map memory in a predetermined order.

According to a further embodiment of the present invention, the interface system comprising: a font memory for storing dot information as dot patterns in accordance with a plurality of characters represented by character codes in advance; a pseudofont memory for storing dot information in the form of matrix having column vectors and row vectors thereof multiplied respectively by a predetermined value in advance, the column vectors being obtained by matrix-transposing row vectors of several series of dot data; judging means for distinguishing between the character codes and the series of dot data; a bit map memory for storing dot information to be printed over a predetermined print area; management means for accessing the font memory and retreaving therefrom the dot information corresponding to the character codes and writing the same in the bit map memory when the judging meand detects the character codes while accessing the pseudofont memory and retreaving therefrom the dot information corresponding to the series of dot data and writing the same in the bit map memory when the judging means detects the series of dot data; and output means for outputting the dot information stored in the bit map memory in a predetermined order.

BRIEF DESCRPITION OF THE DRAWINGS

FIG. 1 is a schematic block diagram of an interface system of the invention,

FIG. 2 is a schematic illustrating a structure of recording information adapted for a wire-dot impact printer, FIG. 3a is a schematic illustrating a structure of serial data, FIG. 3b is a schematic illustrating a structure of a transposed matrix, FIG. 3c is a schematic illustrating a structure of pseudofont data, FIG. 4a is a schematic illustrating one example of recording data for the wire-dot impact printer, FIG. 4b is a schematic illustrating one example of pseudocharacter codes for the wire-dot impact printer, FIG. 4c is a schematic illustrating one example of pseudofont data for the wire-dot impact printer, FIG. 5 is a schematic illustrating a data overwriting operation, FIGS. 6a and 6b are a flow chart illustrating a data laying-out operation over a bit map memory, FIG. 7 is a schematic showing an alternate embodiment of pseudofont data corresponding to FIG. 4c, FIG. 8a is a schematic illustrating one example of recording data for the wire-dot impact printer, FIG. 8b is a schematic illustrating one example of pseudocharacter code for the wire-dot impact printer, FIG. 8c is a schematic illustrating one example of pseudofont data for wire-dot impact printer, FIG. 9 is a schematic illustrating a data overwriting operation, FIGS. 10a, 10b and 10c are a flow chart illustrating a data laying-out operation over a bit map memory, FIG. 11 is a schematic of a portion of the bit map memory, FIG. 12 is a schematic illustrating a further embodiment of pseudofont data corresponding to FIG. 4c, and FIG. 13 shows correspondence between the output serial data and the pseudocharacter codes.

DESCRIPTION OF PREFERRED EMBODIMENTS

Preferred embodiments of the present invention will be particularly described hereinafter with reference to the accompanying drawings.

First, the operations of the entire system including an interface of the invention acting between a printer and and a host computer 1 will be briefly described where a recording operation is carried out by the printer based on recording information transferred via the interface from the host computer 1.

Figure 1:
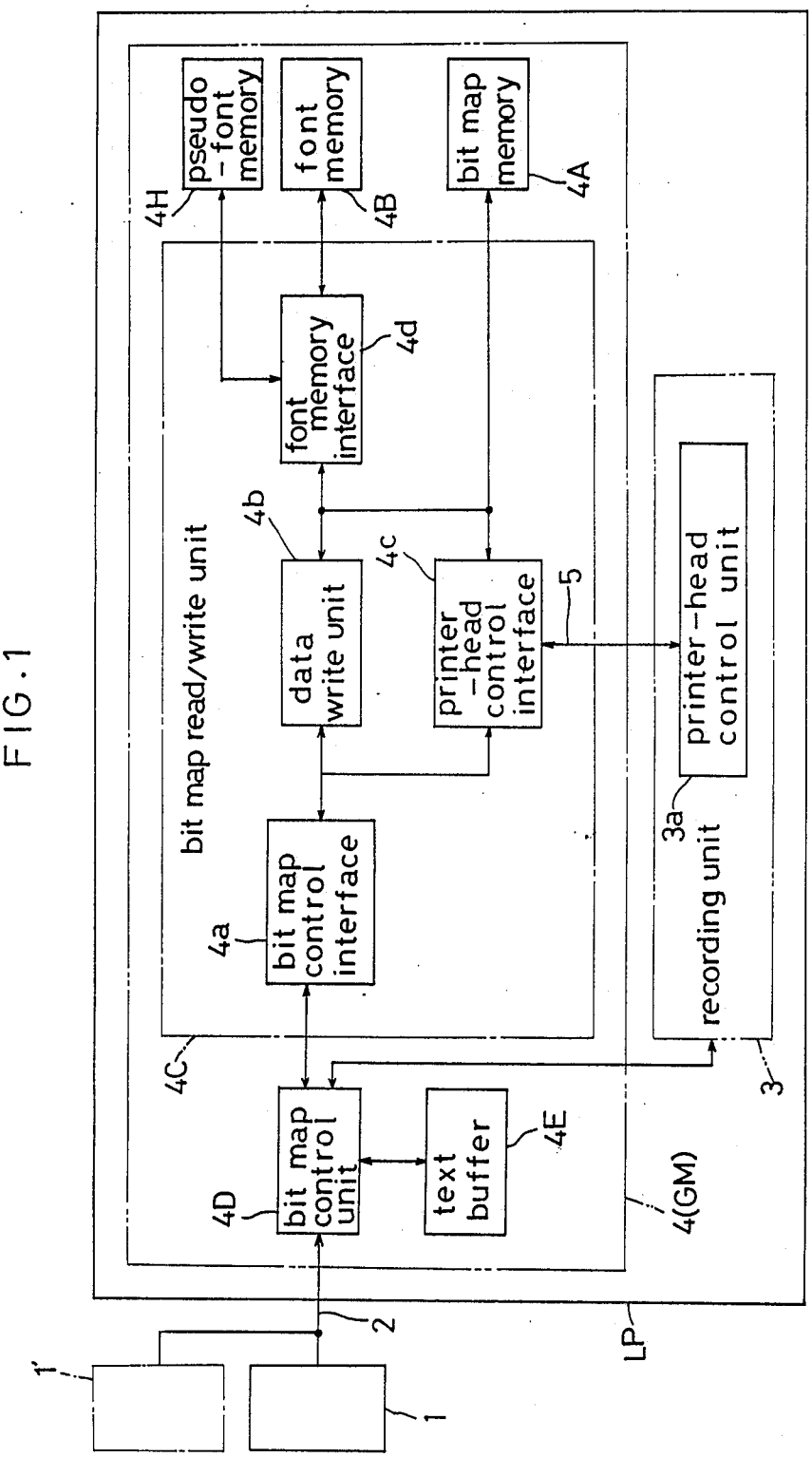

As shown in FIG. 1, the recording information from the host computer 1 is inputted via a cable 2 to a laser beam printer LP as one example of printer. The laser beam printer LP includes a recording unit 3 where a latent image formed on a photosensitive member through a laser beam excitation is developed and transferred and fixed onto a recording sheet and a print controller 4 acting as an interface device for controlling the recording operations at the recording unit 3 based on inputted recording information. The recording unit 3 receives the recording information via a data bus 5 from the print controller 4 and bilaterally communicates recording control information with the print controller 4 via a command bus 6.

The print controller 4 includes a bit map memory 4A having a capacity for storing one page of recording information, a font memory 4B, a bit map read/write unit 4C for reading and writing recording information from and in the bit map memory 4A, and a bit map control unit 4D for controlling the data write operation to the bit map memory 4A and the recording operation.

The recording information from the host computer 1 is inputted to the bit map control unit 4D. This bit map control unit 4D has a text buffer memory 4E with a storage capacity corresponding to one page of recording information and the unit 4D temporarily edits the inputted one page of recording information through this text buffer memory 4E. This editted information is inputted to the bit map read/write unit 4C to be written in the bit map memory 4C. After this data write operation in the bit map memory 4C, the bit map read/write unit 4C, in response to a print enable signal from the bit map control unit 4D, successively reads out the recording information from the bit map memory 4A and provides the same on the data bus 5 to the recording unit 3.

The bit map read/write unit 4C includes a bit map control interface 4a, a data write unit 4b, a printer-head control interface 4c, a font memory interface 4d and so on. The bit map control interface 4a distinguishes the data inputted from the bit map control unit 4D between recording data and printer control data and routes the former to the data write unit 4b and the latter to the printer-head control unit 3a via the printer-head control interface 4c, respectively. The printer-head control interface 4c, when receiving a print enable signal as printer control data, reads out the information from the bit map memory 4A and routes the same to the print control unit 3a of the recording unit 3. On the other hand, the data write unit 4b writes the recording information at a predetermined storage area of the bit map memory 4A.

Incidentally, the recording information from the host computer 1 comprises two types; namely, one being character information transferred as a group of characters constituting the image to be recorded and commonly referred to as character codes in the 8-bit ASCII format, the other type being image information transferred as a group of dots together with directly constituting the graphic image to be recorded.

If the bit map control unit 4D determines the inputted recording information as the latter type of image information, this recording information is routed via the bit map control interface 4a and the data write unti 4b of the bit map read/write unit 4C to be successively written into the bit map memory 4A from a first storage area. On the other hand, if the inputted recording information comprises the character information, the bit map control unit 4D recongnizes this by a command code inputted thereto prior to the recording information, and the data write unit 4b accesses the font memory 4B through the font memory interface 4d and retreaves therefrom font data corresponding to the recording information and writes the same into the bit map memory 4A.

The structure of the above-described font memory 4B and read/write operation of the font data from the font memory 4B to the bit map memory 4A are well known from, e.g., a Japanese patent laid open under Showa No. 61-113089. Therefore, these structure and operation will be discussed only briefly in the following paragraphs.

The font data stored at the font memory 4B comprise a plurality of dot data aligned on a virtual matrix consisting of a plurality of rows and columns. More particularly, the data comprise a dot matrix consisting of data binarized in terms of recording density and aligned in 20 rows and 20 columns.

The data write unit 4b, based on the inputted character code, designates an address at the font memory 4B storing the font data corresponding to the particular character code and retreaves the same therefrom. Then, the data write unit 4b, based on the alignment of the inputted character code, designates a starting address in the storage area of the font data on the bit map memory 4A and writes the read-out font data at the storage area on the bit map memory 4A.

When a plurality of character codes are transferred from the host computer 1 as character information, the codes are in such alignment where a plurality of recording rows are vertically aligned from the top to the bottom and the characters constituting the respective rows are laterally aligned from the left to the right. Accordingly, the data write unit 4d determines the storage area of each font data in such a way that the font data corresponding to the respective character codes are aligned from the top to the bottom and from the left to the right on the virtual matrix formed in the bit map memory 4A.

More specifically, in determining the storage area, the data write unit 4b designates only an address data (to be referred to as a starting address data hereinafter) for storing a dot data positioned at row 1: column 1 of a given font data. With this, the remaining dot data of this font data are automatically written on the bit map memory 4A. Then, when a plurality of font data are stored in the bit map memory 4A in the above-described manner, the determination of the storage areas by the data write unit 4b is effected by adding to the starting address data a data amount (16 bits) corresponding to the amount of font data.

In the above-described manner, a plurality of recording dot data stored in the bit map memory 4A by the print controller 4 acting as image data generating means GM are read out by the printer-head control interface 4c as output means in the order of row-wise successive scanning method from the virtual matrix formed in the bit map memory 4A and provided to the printer-head control unit 3a of the recording unit 3. As the laser beam scans the surface of photosensitive member in the row-wise successive scanning method, the printer-head control unit 3a effects the recording operation by modulating the scanning laser beam based on the plurality of dot data.

The above-described recording system includes the combination of the laser beam printer which is increasingly popular for its high speed and high resolution recording performance and the host computer 1 specially adapted therefor. However, some of the recording systems use in combination a more conventional wire-dot impact printer and a host computer adapted therefor.

This wire-dot printer, though not shown, includes a recording head having a plurality of vertically aligned wire pins. In operation, as this recording head is moved laterally, the wire pins selected in accordance with the recording information strike an ink ribbon against a recording medium thereby thereby printing an image thereon. Accordingly, when this wire-dot impact printer as an output terminal device receives from a host computer recording information as image information directly corresponding to an image to be recorded, the recording information is transferred as serial data consisting of a plurality of bits of vertically aligned data corresponding to the number of the wire pins rearranged in the lateral orientation.

For the above reason, in spite of its superior performance, it is impossible to use the laser beam printer as it is as an output terminal device for the host computer specially adapted for the wire-dot impact printer.

Considering the above-described inconvenience, the present invention provides an interface system which makes it possible to use the page printer such as the laser beam printer as an output terminal device with a host computer specially adapted for the wire-dot impact printer through effective utilization of the features inherent in the laser printer without incurring cost disadvantages. Next, the construction of the interface system will be particularly described. Incidentally, in the following embodiments, the recording information is transferred from a host computer 1' specially adapted for the wire-dot impact printer as 8-bit serial data. However, the present invention may be embodied also in other cases where the data is transferred by other word lengths longer or shorter than 8-bit length.

The host computer 1' provides 8-bit serial data representing a graphic image to the interface system of the present invention. Then, when data judging means determines the inputted data as graphic-image-representing serial data, data read/select means selects a pseudofont memory as the access target by changing the designated address data for read-out, and layout means retreaves from the pseudofont memory pseudofont data corresponding to the inputted pseudocharacter code and writes the same on the bit map memory.

The pseudofont data includes 8 units of dot data constituting a column vector having a transposed matrix relationship relative to a row vector constituted by 8-bit serial data. That is, while the 8 bits of serial data are aligned along the row direction of the virtual matrix formed in the bit map memory, the pseudofont data has the 8 units of dot data aligned along the column direction of the virtual matrix.

On the other hand, if the data judging means determines the inputted data as serial data representing a graphic image, the layout means determines a storage area on the bit map memory in such a way that the 8 units of dot data in the pseudofont data contained in the transposed matrix relative to the 8 bit serial data are aligned from the position of row 1: column 1 to the position of row 1: column 8 with a plurality of dot data trains each consisting of 8 units of dot data being aligned in succession in said order.

If the inputted data comprise character code data, the layout means retreaves font data from the font memory and writes the same on the bit map memory. This font data is aligned on a virtual matrix of 16 dots × 16 dots. In order to lay out this font data over the bit map memory, the layout means designates a first address for storing the data positioned at row 1: column 1 and then designates a second address for a next font data by adding to the first address on font data train (16 dots (=2 bytes) in the case of 16 dots × 16 dots) in the row direction.

That is to say, if the pseudofont data comprises 1 dot × 8 dots as described in the above example, the read/write means designates the first address for storing the data in the first row of the pseudofont data and then designates the second address by adding to the first address one dot amount in the row direction. In this way, based on the result of judgement by the data judging means, the layout means varies the increase amount of address data in designating the next address on the bit map memory. With the above, on the virtual matrix in the bit map memory, a plurality of recording dot data are written in succession as if a plurality of dot data trains each consisting of 8 units of dot data aligned in the column direction were successively stored in the row direction of the matrix. As the result, in the bit map memory, the plurality of recording dot data trains are stored in the same manner as the wire-dot impact printer receives the 8-bit serial data from the host computer and write the same on the bit map memory.

Thereafter, for an actual recording operation, output means reads out the plurality of dot data stored in the bit map memory without changing the predetermined order of the data and outputs the same to modulating means for modulating laser beam in case the employed printer is a laser beam printer. As the result, the same recording information may be obtained by the laser beam printer as by the wire-dot impact printer.

That is to say, in the interface system of the invention, each of the predetermined number of groups of serial data directly corresponding to the recording image is interpreted as a character code and processed in the same manner as an actural character code corresponding to a character. Accordingly, with only the addition of the pseudofont memory having substantially the same construction as the font memory and the change in the software, the page printer may be used as an output terminal device of a host computer which is designed to provide the image information under the protocol for the wire-dot impact printer. Whereas, the constructions of the bit map memory and the output means need not be modified and no hardware is needed for writing the serial data at the predetermined address on the bit map memory.

Figure 2:
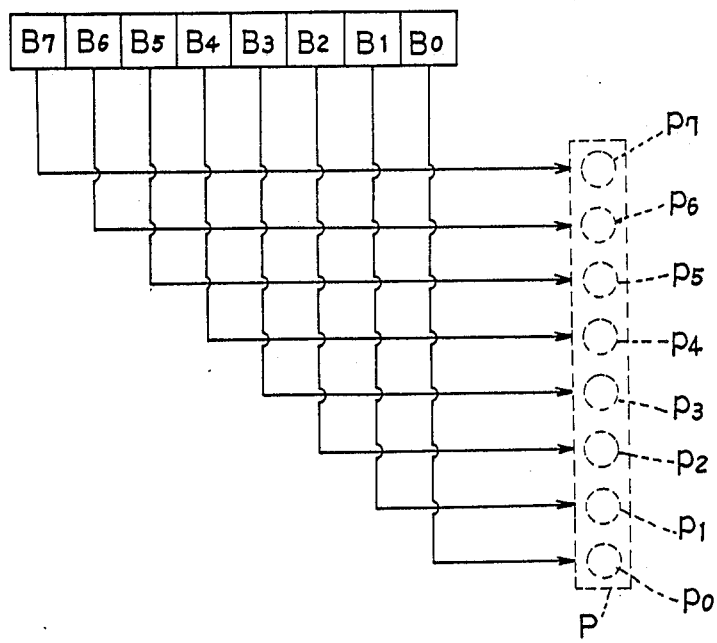

As shown in FIG. 2, in the case of a wire-dot impact printer, an 8-bit serial data B0 through B7 transferred from the host computer 1' via a cable 2' are inputted respectively to eight wire pins p0 through p7 of the recording head P of the printer to control its output.

On the other hand, in the case of the laser beam printer LP, since the 8 bit serial data B0 through B7 correspond to the eight wire pins p0 through p7 vertically aligned in the recording information, the bit map control unit 4D routes these data B0 through B7 as a pseudocharacter code having the same structure as the aforedescribed character code to the bit map read/write unit 4C of the printer controller 4.

The bit map control unit 4D effects a temporary editing operation by the text buffer memory 4E on the serial data from the host computer 1' in the same manner as the serial data from the impact-printer host computer 1. Also, the bit map read/write unit 4C writes the temporarily edited data on the bit map memory 4A in the same manner as the serial data from the impact-printer host computer 1.

That is to say, since the serial data through the bit map control unit 4D are grouped into 8-bit words, each 8-bit word is interpreted as a pseudocharacter code corresponding to pseudofont data. Accordingly, when the serial data, i.e., the image information from the impact-printer host computer is stored in the bit map memory 4A, the serial data may be processed in the same manner as a real character code. As the result, the system may be formed inexpensively by effectively utilizing the functions inherent in this type of printer.

In order to carry out the above processing, there is provided a pseudofont memory 4H having substantially the same construction as the font memory 4B. The construction of this pseudofont memory 4H will be described next.

As may be apparent from FIG. 2, in the data from the host computer 1' for the impact printer, the 8 bit serial data B0 through B7 correspond to the eight wire pins p0 through p7 vertically aligned in the recording information. That is to say, the serial data forms on a virtual plane thereof a column vector having 8 row elements.

Figure 3A:
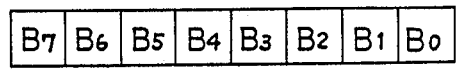
Figure 3B:
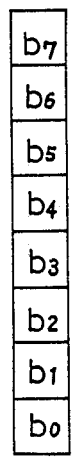

Thus, each of the plurality of pseudofont data stored in the pseudofont memory 4H comprises 8 units (elements) of dot data b0 through b7 constituting a column vector shown in FIG. 3b having a transposed matrix relationship relative to a row vector B0 through B7 shown in FIG. 3a constituted by the 8 bit serial data through the data converting means.

For example, for serial data "3CH" of FIG. 4b with respective bits thereof, corresponding to the wire pins p0 through p7 shown in FIG. 4a, there is provided pseudofont data shown in FIG. 4c.

The bit map control unit 4D receives the recording information from the host computer 1' and by a command data attached to the leading end of the serial data, the unit 4D recognizes this and determines serial data successive thereto as serial data under the protocol for the wire-dot impact printer. That is to say, this bit map control unit 4d constitutes the data judging means in the interface system of the present invention.

With the above judgement by the bit map control unit 4D, the data write unit 4b selectes the pseudofont memory 4H as the access target. More specifically, an address data to be accessed by the data write unit 4b is set in the pseudofont memory storing the pseudofont data corresponding to the pseudocharacter codes.

Also, when the bit map control unit 4D judges the serial data as under the protocol for the wire-dot impact printer, desision storage areas for the font data on the bit map memory 4A are set for the pseudofont data. More specifically, the increase of the starting address for each font data effected in writing a plurality of font data is changed from 16 bits corresponding to the amount of font data to 1 bit corresponding to the pseudofont data.

With the above arrangement, as a plurality of serial data are inputted in the form of 8-bit words from the bit map control unit 4D, the data write unit 4b of the bit map read/write unit 4C interprets each serial data word as a pseudocharacter code and reads out from the pseudofont memory pseudofont data corresponding thereto. Then, the data write unit 4b writes these plurality of pseudofont data on the bit map memory 4A such that the data words are aligned from the left to the right and from the top to the bottom on the virtual matrix formed in the bit map memory 4A.

Incidentally, when the data converting means adapts the 8 bit serial data to correspond to the pseudocharacter codes, since the codes from "00H" to "1FH" are used as printer control codes, the inputted 8 bit serial data is added with "20H" to be used as a pseudocharcter code. FIG. 13 shows the relationship between the inputted serial data and the pseudocharacter codes.

Figure 5:
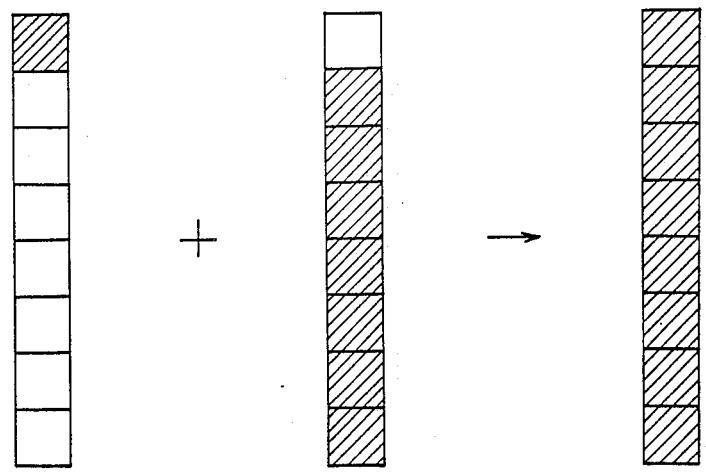

Also, in the case of "E0H" through "FFH" of the output serial data, since "00H" through "1FH" are unusable as pseudocharacter codes, two pseudofont data are overwritten at the same address on the bit map memory 4A. For example, for the serial data "FFH", as shown in FIG. 5, pseudofont data "80H" ("A0H", as pseudocharacter code) and pseudofont data "7FH" ("9FH" as pseudocharacter code) are overwritten at the same address by skipping once the address data amount increase effected by the data layout means.

In the above-described manner, a plurality of recording dot data are stored in the same arrangement as an actural recording informtion on the virtual matrix of the bit map memory 4A.

After the above storing operations, the printer head control unit 3a operates in response to a print enable signal from the bit map control unit 4D in the same manner as the case of the input of character codes.

Figure 6A:
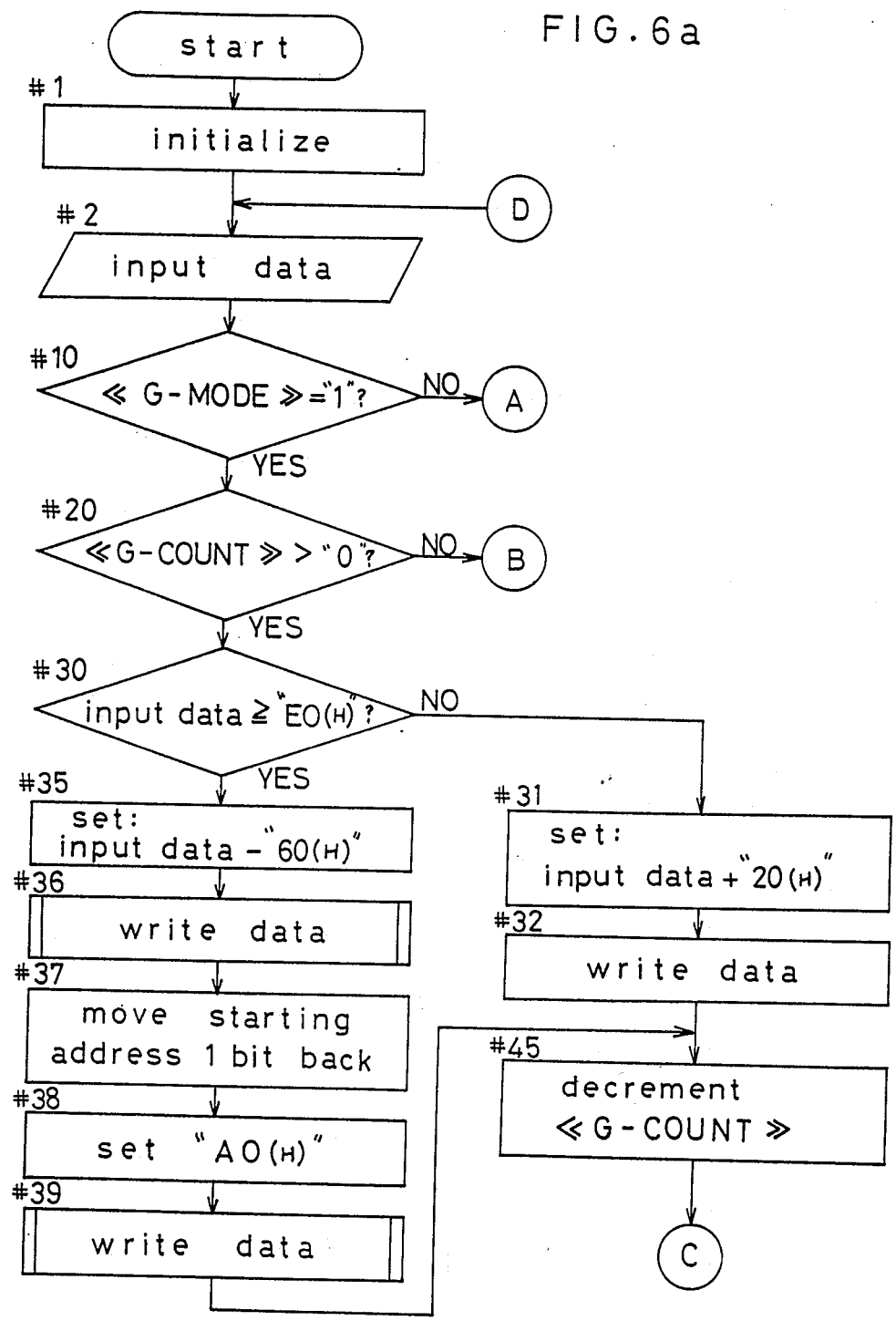
Figure 6B:
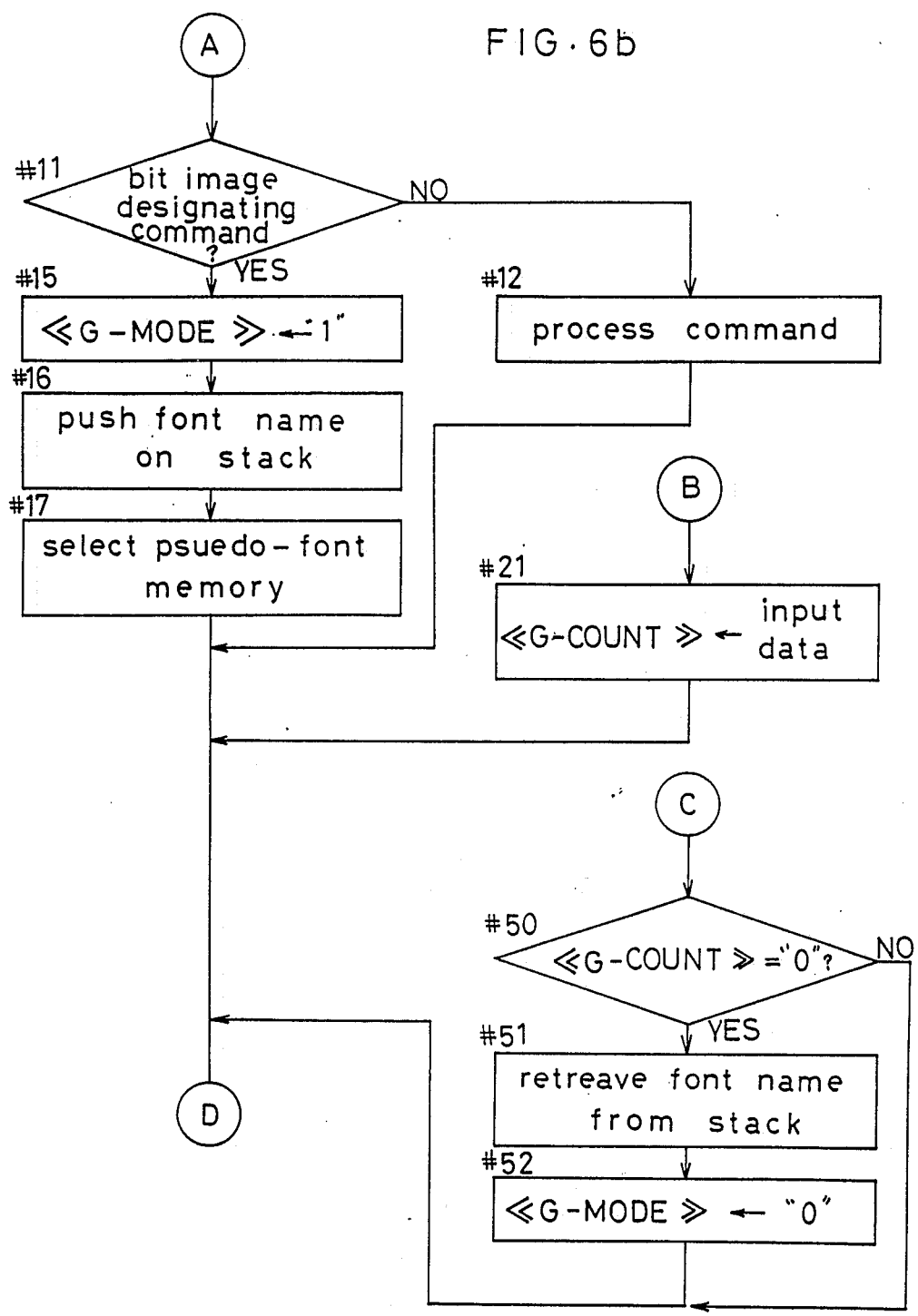

Next, writing operations of graphic image data as another example of image information from the impact-printer host computer 1' will be particluarly described with reference to a flow chart of FIG. 6 illustrating processes effected by a microcomputer of the bit map control unit 4D.

In the graphic image information from the host computer1', in general, the first 1 byte comprises a bit image designating command representative of the type of data, the next 1 byte comprises an image size data representative of a total number of the image data and these 2 bytes are followed by a plurality of image data. Incidentally, in the flow chart of FIGS. 6a and 6b, writing operations of character codes and other operations not directly related to the present invention are not described or described only briefly.

With a start of this program, initial setting operations are carried out at step #1. That is, a process-mode flag G-MODE, which is set during processing of graphic image data, and a data counter G-COUNT, which counts the number of graphic image data, are both reset to '0'. Then, at step #2, data input operation is effected byte-by-byte.

At step #10, it is judged whether or not the flag G-MODE is set, i.e. whether the system is currently processing graphic image data or not. If it is judged that the flag G-MODE is not set; then, it is judged whether the inputted data comprises a bit image designating command or not at step #11.

If it is judged that the inputted data is not the bit image designating command, e.g., that the inputted data is a character code designating command, a subsequent process, i.e., writing operation of the font data on the bit map memory 4A in the case of the character code designating command is set at step #12. Then, the program returns to step #2 to input next byte data.

On the other hand, if it is judged at step #11 that the inputted data comprises a bit image designating command, the flag G-MODE is set at step #15. At step #16, the currently selected font name (a name for identification provided to each character front in case the font memory 4B stores font data corresponding to plurality of types of character fonts, or a name for identifying the font memory 4B per se in case the memory 4B stores font data corresponding to only one type of character font) is pushed on the stack. At step #17, the pseudofont memory 4H is selected. Then, the program returns to step #2 to next byte data.

On the other hand, if it is judged at step #10 that the flag G-MODE is set data, i.e. that the system is now processing graphic image data, the program checks the data counter G-C-COUNT at step #20. If this data counter G-COUNT carries '0' since the process is immediately after initial data input, the image size data is loaded at the data counter G-COUNT at step #21. Then, the program returns to step #2 to input next byte data.

On the other hand, if it is judged at step #20 that the data counter G-COUNT is not set to '0', the program proceeds to step #30 to judge whether the inputted 8 bit data is greater than "E0H" or not. This is for judging the necessity of the overwriting of the pseudofont data for the reason that the data "00H" through "1FH" are used as printer control codes.

If it is judged at step #30 that the inputted data is smaller than "E0H", this means that the overwriting of pseudofont data is not necessary. Then, at step #31, a pseudocharacter code is generated by adding "20H" to the inputted data. At step #32, a data write subrouting is called for effecting a data write operation based on the pseudocharacter code. In this data write subroutine, a pseudofont data corresponding to the pseudocharacter code is retreaved from the pseudofont memory 4H and written at a predetermined storage area in the bit map memory based on the set starting address data and then the starting address data is added with 1 bit.

On the other hand, if it is judged at step #30 that the input data is greater than "E0H", this means that the overwriting of pseudofont data is necessary. Then, at step #35, "60H" (obtained by "20H"—"80H") is subtracted from the inputted data to generate a first pseudocharacter code, and a data write subroutine is called at step #36. At step #37, the starting address data is decreased by 1 bit, and "A0H" is set as a second pseudocharacter code for the overwriting operation at step #38. In succession, a data write subroutine is called at step #39.

After returning from the data write subroutine called at step #32 or at step #39, the program decrements the data counter G-COUNT at step #45, and at step #50, it is judged whether or not the data counter G-Count has been decremented to '0', i.e., whether all the data have been inputed or not.

If it is judged at step #50 that the data counter G-COUNT has not yet been decrement to '0', the program returns to step #2 to input next byte data. On the other hand, if it is judged that the data counter G-COUNT has been decremented to '0', i.e., that all the data have been inputted, at step #51 the program again selectes the font name which was pushed on the stack at step #16. Then, after resetting the process-mode flag G-MODE, the program returns to step #2 for next data input.

Next, there will be described a further embodiment of the interface system having a function to adjust recording resolution of the page printer such as a laser beam printer which resolution is generally higher than that of the wire-dot impact printer.

If a laser beam printer has a resolution twice higher than that of the wire-dot impact printer, the pseudofont data include 32 units of dot data constituting a virtual matrix of 16 rows×2 columns, which is a column vector doubled in both the row and column directions and having a relationship of transposed matrix relative to the row vector containing 1 row and 8 column elements constituted by the 8 bit serial data. That is to say, while the 8 bit serial data are aligned in the row direction on the virtual matrix in the bit map memory, the pseudofont data include 32 units of dot data alined in 16 rows and 2 columns on the virtual matrix.

On the other hand, when the data judging means judges the inputted data as graphic image serial data, the layout means designates the decision storage areas on the bit map memory in such as way that the 32 units of dot data of the pseudofont data included in the virtual matrix comprising the transposed matrix of the 8 bit serial data doubly extended in the row and column directions are aligned from the position of row 1: column 1 through the position of row 2 : column 16, with a plurality of dot data groups each consisting of 32 units of dot data being successively aligned adjacent without interspace in the row direction.

If the inputted data comprise character data, the layout means retreaves font data from the font memory and lays out the same over the bit map memory. The font data are alinged on a virtual matrix of 16 dots×16 dots for example. Then, in order to lay out the font data over the bit map memory, the layout means designates a first address for storing the data positioned at row 1: column 1, and then a second address for the next font data by adding to the first address 1 font data amount (i.e., 16 dots (=2 byte) in the case of 16 dots×16 dots).

That is to say, if the pseudofont data comprises 2 dots×8 dots as described in the above example, the layout means designates the first address for storing the data in the first row of the pseudofont data and then designates the second address by adding to the first address two dot amount in the row direction. In this way, based on the result of judgement by the data judging means, the layout means varies the increase amount of address data in designating the next address on the bit map memory. With the above, on the virtual matrix at the bit map memory, a plurality of recording dot data are laid out in succession as if a plurality of dot data trains each consisting of 8 units of dot data aligned in the column direction were successively stored in the row direction of the matrix. As the result, in the bit map memory, the plurality of recording dot data trains are stored in the same manner and at the doubled scale as the wire-dot impact printer receive the 8 bit serial data from the host computer and write the same on the bit map memory.

Thereafter, for an actual recording operation, the output means reads out the plurality of dot data stored in the bit map memory without changing the predetermined order of the data and outputs the same to modulating means for modulating laser beam if the printer is a laser beam printer. As the result, the same recording information may be obtained by the laser beam printer as by the wire-dot impact printer.

That is to say, in the interface system of the invention, each of the predetermined number of groups of serial data directly corresponding to the recording image is interpreted as a character code and processed in the same manner as a real character code corresponding to a character. Accordingly, with only the additon of the pseudofont memory having substantially the same construction as the font memory and the change in the software, the page printer may be used as an output terminal device of a host computer for providing the image information under the protocol adapted for the wire-dot impact printer. Whereas, the constructions of the bit map memory and the output means need not be modified and no hardware is needed for writing the serial data at the predetermined address on the bit map memory.

Moreover, since the pseudofont data stored at the pseudofont memory include the plurality of dot data constituting the virtual matrix comprising the transposed matrix of the 8 bit serial data multiplied by a predetermined number in the row and column directions, thus, when this type of page printer is used as an output terminal device for the host computer specially adapted for the wire-dot impact printer, if the multiplier is set to correspond to the ratio between the resolution of the page printer and that of the wire-dot impact printer, it becomes possible for the page printer to effect substantially the same recording operation as by the wire-dot impact printer. Further, by using the same construction, it becomes also possible to vary the size of the recording image in any magnification.

In addition, as described above, the respective pseudofont data stored in the pseudofont memory may comprise the font data preliminarily multiplied based on the resolution ratio between the inputted recording information and the empolyed printer. Accordingly, when a high-resolution printer is used for processing low-resolution recording information to obtain a recording image of substantially the same size, this may be carried out by writing the pseudofont data in the pseudofont memory on the bit map memory without necessitating any special data extending operation. As the result, it becomes possible to avoid delay in the processing time due to time-consuming data extending operation needed when the protocol conversion is effected by means of an emulation software.

Figure 3C:
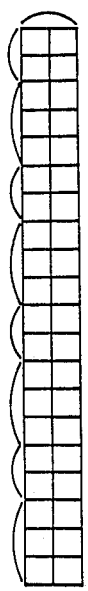

More specifically, the plurality of pseudofont data stored at the pseudofont memory 4H comprise 40 units of dot data shown in FIG. 3c including a column vector b0 through b7 having a relationship of transposed matrix relative to the row vectors B0 through B7 of FIG. 3a constituted by the 8 bit serial data through the data converting means and multiplied by 2 in the row direction and by 2.5 in the column direction, respectively.

Refering more particularly to the pseudofont data, the serial data from the host computer 1' are adapted for a wire-dot impact printer having a resolution of 120 dpi. Whereas, the laser beam printer employed in this embodiment has a resolution of 300 dpi. For this reason, if the pseudofont data are generated from the 8 units of dot data constituting the column vectors of FIG. 3b having the relationship of transposed matrix relative to the row vectors of the serial data adapted for the wire-dot impact printer, this will produce a recording image reduced in each direction by 1/2.5 relative to the desired image.

Thus, if the pseudofont data is produced by preliminarily multiplying the inputted data in the row and column direction by 2.5 which is the ratio between the resolutions of the two printers, it becomes possible to obtain a recording image of substantially the same size.

Figure 11:
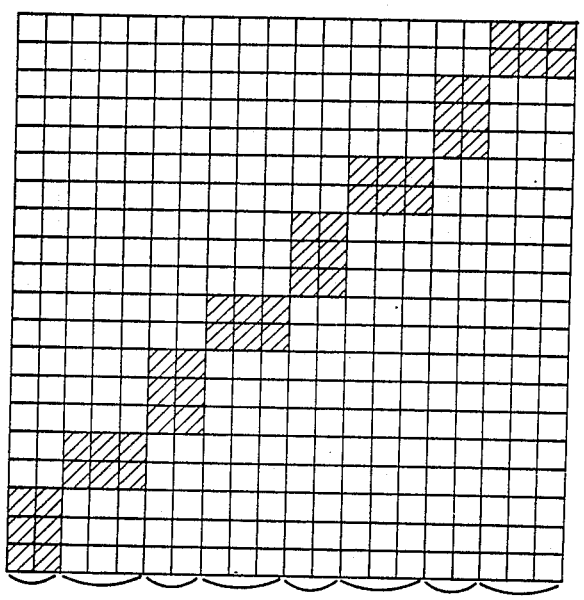

More specifically, the data is multiplied by 2 in the row direction since it is impossible to approximate the opposed end numbers while the same is multiplied by 2.5 in the column direction inculding the end numbers. In the row-wise construction of the pseudofont data, as shown entirely in FIG. 3c, the odd number columns in the column vectors are multiplied by 2 in the column direction while the even number columns are multiplied by 3 in the same direction, thereby multiplying the entire column vectors of the pseudofont data aprroximately by 2.5 in the column direction. On the other hand, since the pseudofont data have the column vectors thereof muliplied by 2 as described above, as shown in FIG. 11, the second rows of the even-numbered pseudofont data are overwritten, thereby multiplying the entire dot data by 2.5.

For example, for serial data "3CH" of FIG. 8b with respective bits thereof corresponding to the wire pins p0 through p7 shown in FIG. 8a, there is provided pseudofont data shown in FIG. 8c.

The bit map control unit 4D receives the recording information from the host computer 1' and by a command data attached to the leading end of the serial data, the unit 4D recognizes this and determines serial data successive therto as serial data under the protocol for the wire-dot impact printer. That is to say, this bit map control unit 4d constitutes the data judging means in the interface system of the present invention.

With the above judgement by the bit map control unit 4D, the data write unit 4b selects the pseudofont memory 4H as the access target. More specifically, address data to be accessed by the data write unit 4b is set in the pseudofont memory storing the pseudofont data corresponding to the pseudocharacter codes.

Also, when the bit map control unit 4D judges the serial data as under the protocol for the wire-dot impact printer, decision storage areas for the font data on the bit map memory 4A are set for the pseudofont data. More specifically, the increase of the leading address for each font data effected in writing a plurality of font data is changed from 20 bits corresponding to the amount of font data to 2 bits corresponding to the pseudofont data.

With the above arrangement, as a plurality of serial data are inputted by 8 bits from the bit map control unit 4D, the data write unit 4b of the bit map read/write unit 4C interprets each serial data group as a pseudocharacter code and reads out from the pseudofont memory 4H pseudofont data corresponding thereto. Then, the data write unit 4b writes these plurality of pseudofont data on the bit map memroy 4A such that the data groups are aligned from the left to the right and from the top to the bottom on the virtual matrix formed in the bit map memory 4A.

Incidentally, when the data converting means adapts the 8 bit serial data to correspond to the pseudocharacter codes, since the codes from "00H" to "1FH" are used as printer control codes, the inputted 8 bit serial data is added with "20H" to be used as a pseudocharacter code. Table 1 shows the relationship between the inputted serial data and the pseudocharacter codes.

Also, in the case of "E0H" through "FFH" in the ouput serial data, since "00H" through "1FH" are unusable as pseudocharacter codes, two pseudofont data are overwritten at the same address on the bit map memory 4A. For example, for the serial data "FFH", as shown in FIG. 8, pseudofont data "80H" ("A0H" as pseudocharacter code) and pseudofont data "7FH" ("9FH"as pseudocharacter code) are overwritten at the same address by skipping once the address data amount increase effected by the data layout means.

In the above-described manner, a plurality of recording dot data are stored in the same arrangement as an actual recording information on the virtual matrix of the bit map memroy 4A.

After the above storing operations, the printer head control unit 3a operates in response to a print enable signal from the bit map control unit 4D in the same manner as the case of the input of character codes.

Figure 10A:
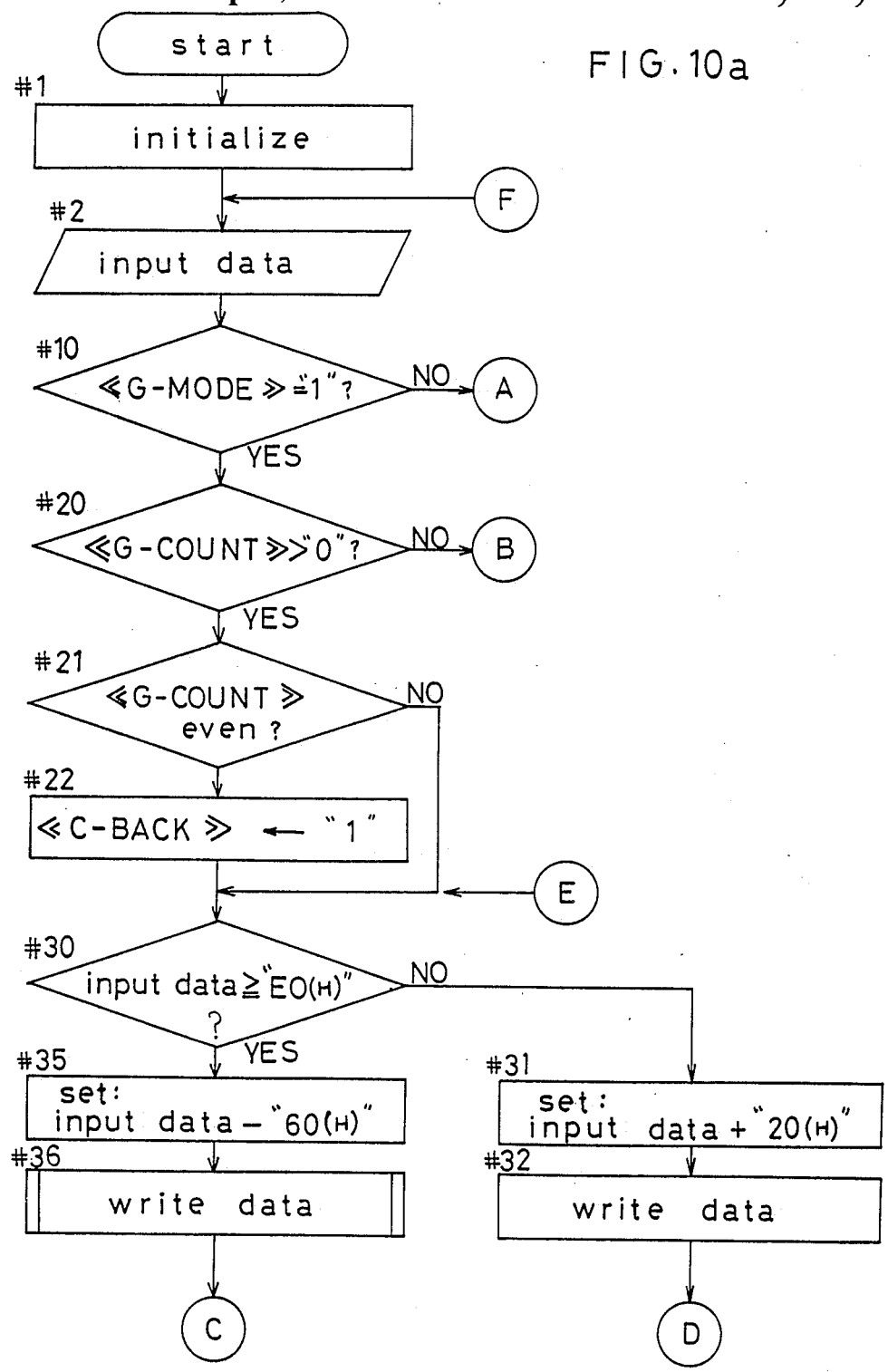
Figure 10B:
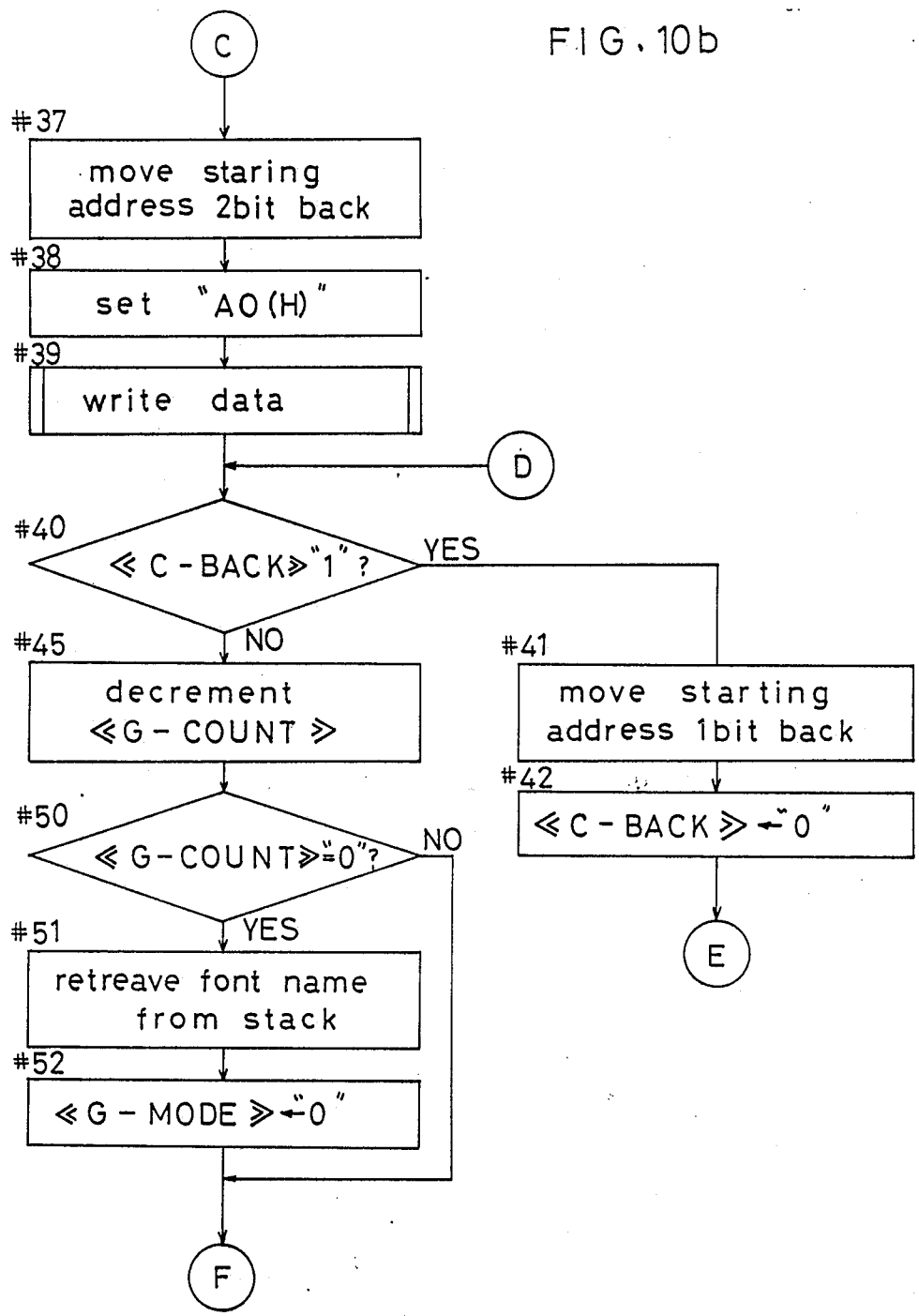
Figure 10C:
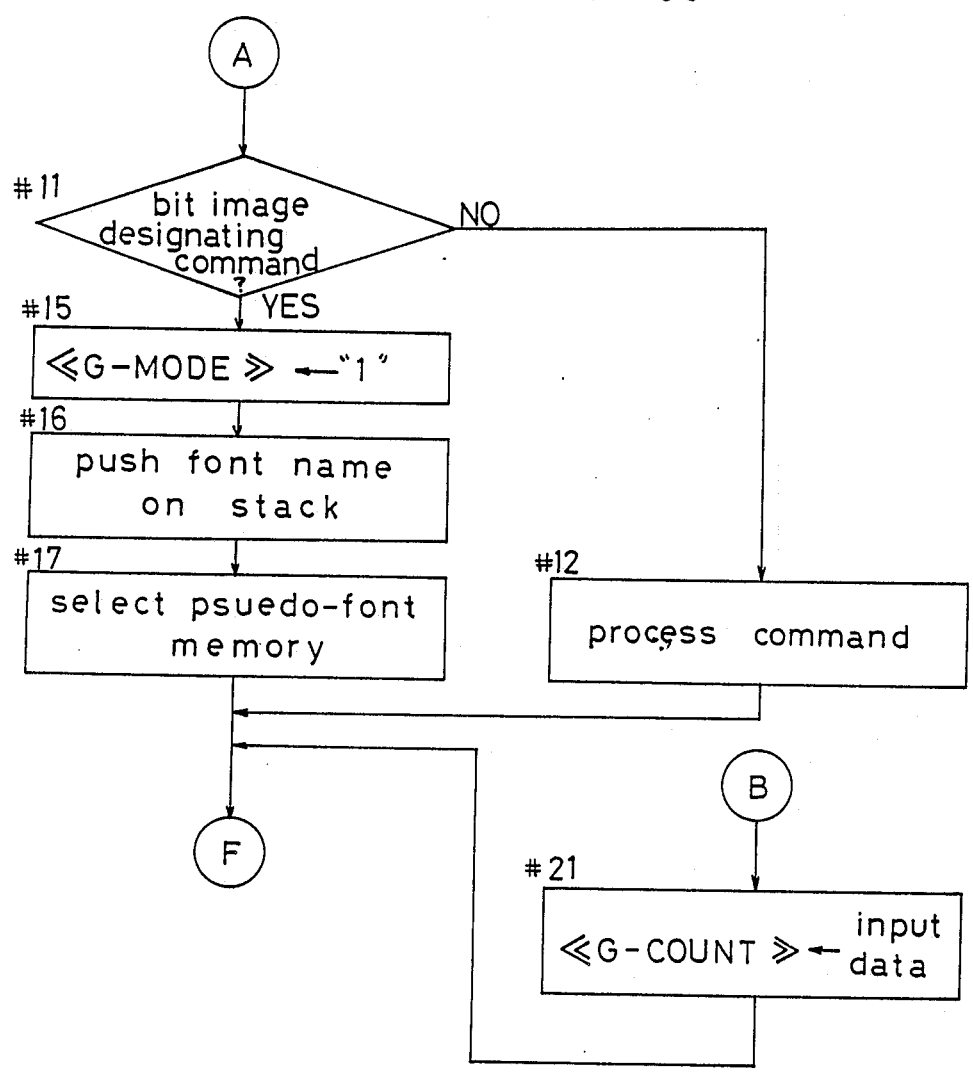

Next, writing operations of graphic image data as image information from the host computer 1' will be particularly described with reference to a flow chart of FIGS. 10a, 10b and 10c illustrating processes effected by the microcomputer of the bit map control unit 4D.

In the graphic image information from the host computer 1', in general, the first 1 byte comprises a bit image designating command representative of the type of data, the next 1 byte comprises an image size data representative of a total number of the image data and these 2 bytes are followed by a plurality of image data. Incidentally, in the flow chart of FIG. 10, writing operations of character codes and other operations not directly related to the present invention are not described or described only briefly.

With a start of this program, initial setting operations are carried out at step #1. That is, the process-mode flag G-MODE, which is set during processing of graphic image data, and the data counter G-COUNT, which counts the number of graphic image data, are both reset to '0'. Then, at step #2, data input operation is effected byte-by-byte.

At step #10, it is judged whether or not the flag G-MODE is set, i.e., whether the system is currently processing graphic image data or not. If it is judged that the flag G-MODE is not set, it is judged whether the inputted data comprises a bit image designating command or not at step #11.

If it is judged that the inputted data is not the bit image designating command, e.g., that the inputted data is a character code designating command, a subsequent process, i.e., writing operation of the font data on the bit map memory 4A in the case of the character code designating command is set at step #12. Then, the program returns to step #2 to input next byte data.

On the other hand, if it is judged at step #11 that the inputted data comprises a bit image designating command, the process-mode flag G-MODE is set at step #15. At step #16, the currently selected font name (a name for identification provided each front in case the fornt memory 4B stores font data corresponding to plurality of types of character fonts, or a name for indentifying the font memory 4B per se in case the memory 4B stores only font data corresponding to only one type of character font) is pushed on the stack. At step #17, the pseudofont memory 4H is selected. Then, the program returns to step #2 to input next byte data.

On the other hand, if it is judged at step #10 that the flag G-MODE is set, i.e., that the system is now processing graphic image data, the data counter G-COUNT is checked at step #20. If this data counter G-COUNT carries '0' since the process is immediately after initial data input, the image size data is loaded at the data counter G-COUNT at step #21. Then, the program returns to step #2 to input next byte data.

On the other hand, if it is judged at step #20 that the data counter G-COUNT is not set to '0', the program proceeds to step #30 to judge whether the data counter G-COUNT carries an even value or not. This is for judging the necessity of the overwriting of the pseudofont data in the row direction.

If it is judged at step #30 that the data counter G-COUNT carries an even value, this means that the overwriting of pseudofont data is necessary. Then, at step #22, an overwrite flag C-BACK is set and the program advances to step #30. On the other hand, if it is judged that the data counter G-COUNT does not carry an even value, this means that no overwrite operation is necessary. Then, the program directly advances to step #30. At this step #30, it is judged whether the inputted 8 bit data is greater than "E0H" or not. This is for judging the necessity of the pseudofont data overwriting operation for the reason that the data "00H" through "1F" are used as the printer control codes.

If it is judged that the inputted data is smaller than "E0H", the overwriting of the pseudofont data is not necessary; then, at step #31, a pseudocharacter code is generated by adding "20H" to the inputted data. At step #32, a data write subroutine is called for effecting a data write operation based on the pseudocharacter code. In this data write subroutine, a pseudofont data corresponding to the pseudocharacter code is read out from the pseudofont memory 4H and written at a predetermined storage area in the bit map memory based on the set starting address data and then the starting address data is added with 2 bits.

On the other hand, if it is judged at step #30 that the inputted data is greater than "E0H", this means that the overwriting of pseudofont data is necessary. Then, at step #35, "60H" (obtained by "20H"—"80H") is subtracted from the inputted data to generate a first pseudocharacter code, and a data write subroutine is called at step #36. At step #37, the leading address data is decreased by 2 bits, and "A0H" is set as a second pseudocharacter code for the overwriting operation at step #38. In succession, a data write subroutine is called at step #39.

After returning from the data write subroutine called at step #32 or at step #39, the program checks the status of overwrite flag C-BACK. If this overwrite flag C-BACK is set, the program decreased the starting address data by 1 bit at step #41 and resets the overwrite flag C-BACK. Thereafter, the program advances to the flow after step #30 to effect the same pseudofont data overwriting operation. On the other hand, if the overwrite flag C-BACK is not set, the program only decrements the data counter G-COUNT at step #45 and judges at step #50 whether or not the data counter G-COUNT has been decremented to '0', i.e. whether all the data have been inputted or not.

If it is judged at step #50 that the data counter G-COUNT has not yet been decremented to '0', the program returns to step #2 to input next data. On the other hand, if it is judged that the data counter G-COUNT has been decremented to '0', i.e. that all the data have been inputted, at step #51 the program again selects the font name which was pushed on the stack at step #16. Then, after resetting the process-mode flag G-MODE at step #52, the program returns to step #2 for next data input.

Next, various alternate embodiments will be specifically described.

Figure 7:
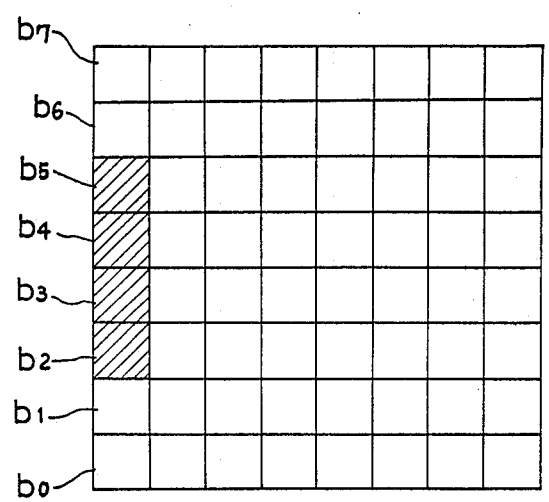

(1) In the first embodiment, the pseudofont data comprise 8 units of dot data aligned in 8 rows and 1 column. Instead, as shown in FIG. 7 for example, the same may comprise 64 units of dot data aligned in 8 rows and 8 columns. In this case, each pseudofont data is written on the bit map memory 4A in such a way that the first through seventh columns of the next pseudofont data are overwritten at the storage area storing the second through eighth columns of the preceding pseudofont data, whereby the pseudofont data are written on the bit map memory 4A in the same manner as in the first embodiment.

Further, though not shown, the pseudofont data may comprise dot data of more than 8 rows and 8 columns, e.g., 24 rows×24 columns, or 24 rows×32 columns and so on. In these cases, the row-wise writing operation is effected in the same manner as in the first embodiment; whereas, in the column direction, the next pseudofont data is overwritten at the storage area storing the portion of the preceeding data after its ninth row.

With the above arrangements, when the font data corresponding to the character codes are constituted by 8 rows×8 columns=64 units of dot data or more, the psuede-font memory 4H may have exactly the same construction as the font memory 4B.

Incidentally, since the overwriting operations are effected in the above-described manner in these constructions, it becomes possible to set the rest of the dot data constituting the column vectors of the pseudofont data other than b0 through b7 to any values. Accordingly, by using a font memory of such a font name where the font data are all blank from the first row and first column position through the eighth row, and if these storage areas carry the dot data b0 through b7 constituting the column vector, and if these storage areas from the position of first row and first column through the eighth row are masked in effecting a recording operation corresponding to the character codes, the font memory 4B may act also as the pseudofont memory 4H, whereby the memory capacity may be reduced.

In short, as long as the the pseudofont data include the plurality of dot data b0 through b7 having the relationship of transposed matrix relative to the row vectors of the serial data of a plurality of bits, the general alignment and construction of the virtual matrix of the entire psudo-font data may be conveniently varied.

Figure 12:
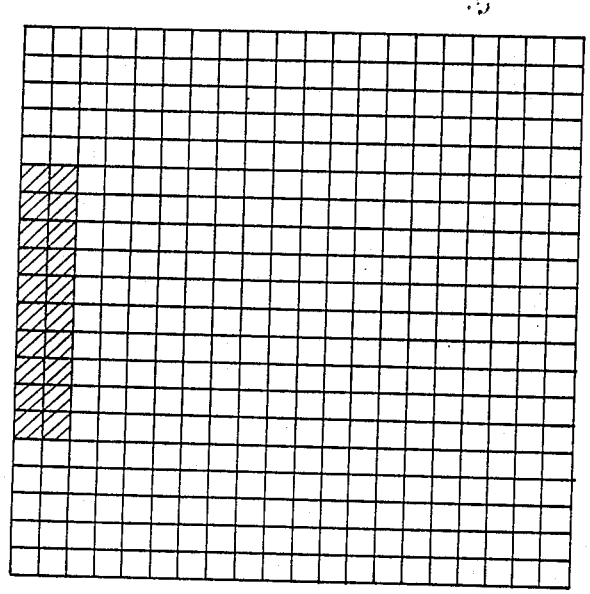

(2) In the second embodiment, the pseudofont data comprise 40 units of dot data aligned in 20 rows and 2 columns. Instead, as shown in FIG. 12 for example, the same may comprise 400 units of dot data aligned in 20 rows and 20 columns. In this case, each pseudofont data is written on the bit map memory 4A in such a way that the first through eighteenth columns of the next pseudofont data are overwritten at the storage area storing the third through twentieth columns of the preceding pseudofont data, whereby the pseudofont data are written on the bit map memory 4A in the same manner as in the second embodiment.

With the above arrangements, when the font data corresponding to the character codes are constituted by 20 rows×20 columns=400 units of dot data, the psuede-font memory 4H may have exactly the same construction as the font memory 4B.

Incidentally, since the overwriting operations are effected in the above-described manner in this construction, it becomes possible to set the rest of the dot data having the dot data b0 through b7 multiplied respectively by predetermined numbers in the row and column directions to any values. Accordingly, by using a font memory of such a font name where the font data are all blank in the first column and from the second row and first column position through the twentieth row, and if these storage areas carry the above-described virtual matrix, and if these storage areas in the first row and from the second row and first column through the twentieth row are masked in effecting a recording operation corresponding to the character codes, the font memory 4B may act also as the pseudofont memory 4H, whereby the memory capacity may be reduced.

In short, as long as the pseudofont data include a virtual matrix having its dot data respectively multiplied by predetermined numbers in the row and column directions and having the relationship of transposed matrix relative to the row vectors of the serial data of a plurality of bits, the general alignment and construction of the virtual matrix of the entire psudo-font data may be conveniently varied.

In the previous embodiment, in order to adapt the recording information suited for the wire-dot impact printer having the resolution of 120 dpi for the laser beam printer having the resolution of 300 dpi, the column vectors b0 through b7 are multiplied by 2.5 in the row direction and by 2 in the column direction. Also, in writing the pseudofont data on the bit map memory 4A, every even-numbered pseudofont data is overwritten. However, the resolution ratio is an integer, the column vectors b0 through b7 of the pseudofont data may be multiplied by the integer in the both of row and column directions. Further, the overwriting operation effected in the course of writing operation on the bit map memory becomes unnecessary.

On the other hand, if the resolution ratio between two types of printers is not an integer, the portions of the pseudofont data corresponding to the column vector b0 through b7 should be varied every even-numbered row or more and appropriate overwriting operation should be effected when the pseudofont data are written in the bit map memory 4A. If the resolutions are not equated or approximated even with the above arrangement, the column vector should be multiplied by a predetermined value close to the resolution ratio, whereby a recording image of substantially the same size may be obtained.

Also, the multiplier for multiplying the column vector b0 through b7 in the row direction and that for multiplying the same in the column direction may be different from each other as in the previous embodiment, or these may be the same as well.

(3) In the previous embodiments, the printer-interface system of the invention is incorporated in the printer body. Instead, the interface system may be attached to the output port of the host computer 1' or may be constructed as a system independent of both of the host computer 1' and the laser beam printer LP. In this way, the installment position and conditions of this interface system may vary conveniently.

(4) The memory capacity of the bit map memory 4A may vary freely. For instance, instead of 1 page, the same may be a half page or ⅓ page in order to reduce the capacity, or reversely a plurality of pages such as 2 pages or 3 pages.

(5) In the previous embodiments, the recording information are transferred in the unit of 8 bits from the host computer 1'. However, with an appropriate modification of the pseudofont data structure, the interface system may be adapted for receiving recording information in other unit formats as well.

Further, it is also conceivable to provide a plurality of types of pseudofont data corresponding to the various numbers of bits constituting each unit of recording information and to use these different types of pseudofont data selectively. In this case, the selection of type of pseudofont data may be effected manually or automatically through judgement of a command data contained in the recording information.

(6) It is conceivable to construct either or both of the pseudofont memory 4H and the font memory 4B as a ROM cartridge detachably attachable to the interface system. This is advantageous in that a plurality of pseudofont data or font data may be utilized without increasing the memory capacity of the interface system.

(7) In the previous embodiments, the text buffer memory 4E for temporary editing is provided in order to facilitate the layout and editing of the recording information. However, this text buffer memory is not an essential component of the interface system of the invention and therefore may be eliminated.

(8) In the previous embodiments, in order to obtain recording information of substantially the same size regardless of difference in the resolutions of the recroding information from the impact-printer host computer 1' and of the laser beam printer LP, the pseudofont data comprise a plurality of dot data constituting a virtual matrix including the column vector b0 through b7 multiplied by predetermined values in the row direction and in the column direction respectively. This construction may be also used for magnifying or reducing the size of the recording information.

Specifically, if the resolution ratio is 3 for example, if pseudofont comprise a plurality of dot data forming a virtual matrix which includes a column vector having a relationship of transposed matrix relative to the row vector formed by given bits of serial data and multiplied by 6 times in the row and column directions; then, the recording image may be multiplied by 2 times in the horizontal and vertical directions respectively. Similarly, if the column vectors of the virtual matrix are multiplied by 2 times in both of the row and column directions, the recording image may be reduced to ⅔ in the vertical and horizontal directions.

(9) In the previous embodiments, the laser beam printer LP is employed as one example of page printer. However, the printer-inteface system of the present invention may be used for any other type of page printer such as an LED printer, a liquid crystal printer or a thermal printer, an ink jet printer and so on.

What is claimed is:

1. In an interface system for receiving from a host computer a series of dot data as print information, and converting the received data to dot information and for providing the same to a printing system, said interface system comprising:
   first memory means for storing dot information as column vectors obtained by matrix-transposing row vectors of several series of dot data in advance;
   second memory means for storing dot information to be printed over a predetermined print area;
   management means for accessing said first memory means to store in said second memory means dot information corresponding to the received dot data; and
   output means for outputting said dot information stored in said second memory means in a predetermined order.

2. An interface system of claim 1, wherein said serial dot data comprise graphic image data for driving a recording head of a wire-dot impact printer, said recording head including a plurality of vertically aligned wire pins.

3. An interface system of claim 1, wherein each said dot information as column vectors obtained by matrix-transposing row vectors of the serial dot data is aligned in one of a plurality of rows of a virtual matrix.

4. An interface system of claim 1, wherein each said dot information as column vectors obtained by matrix-transposing row vectors of the serial dot data is aligned in a first row of virtual matrices each including a plurality of rows and columns.

5. An interface system of claim 1, wherein said first memory is constructed as a detachably attachable ROM cartridge.

6. An interface system of claim 1, wherein said interface system includes a plurality of said first memory means in accordance with types of the serial dot data received from the host computer.

7. An interface system of claim 1, wherein said second memory means has a memory capacity equivalent to less than 1 page of print area.

8. An interface system of claim 1, wherein said second memory means has a memory capacity equivalent to a plurality of pages of print area.

9. An interface system of claim 1, wherein said management means includes;
   data read-select means for processing said serial dot data as a binary code, designating an address in said first memory means in accordance with the binary code and for reading out corresponding dot information therefrom, and
   layout means for designating a starting address in said second memory means in accordance with a format of said serial dot data and successively writing dot information constituting a virtual matrix read out by said data read/select means.

10. An interface system of claim 9, wherein said data read/select means includes first memory selecting means for manually or automatically selecting one from a plurality of first memory means in accordance with a type of said serial dot data.

11. An interface system of claim 9, wherein said layout means overwrites a next virtual matrix on a preceeding virtual matrix from a second row thereof when the dot information read out by said data read/select means is aligned in a first row of a virtual matrix including a plurality of rows and columns.

12. An interface system of claim 1, wherein said output means includes;
   data reading means for successively reading out dot information in the row direction from a plurality of virtual matrices including a plurality of dot information stored in said second memory means, and
   data transfer means for transferring to said print system the dot information read out by said data reading means.

13. An interface system of claim 1, wherein said print system comprises a page printer.

14. An interface system of claim 12, wherein said print system comprises any one of a laser beam printer, LED printer, LCD printer, ink jet printer and a thermal printer.

15. An interface system of claim 1, wherein said interface system is attached to a data output unit of a host computer adapted for an impact printer.

16. An interface system of claim 1, wherein said interface system is provided independently of the host computer and of the print system.

17. In an interface system for receiving from a host computer a series of character codes and a series of dot data as print information, and converting the received codes and data to dot information and for providing the same to a printing system, said interface system comprising:
   a font memory for storing dot information as dot patterns in accordance with a plurality of characters represented by character codes in advance;
   a pseudofont memory for storing dot information as column vectors obtained by matrix-transposing row vectors of several series of dot data in advance;
   judging means for distinguishing between the character codes and the series of dot data;
   a bit map memory for storing dot information to be printed over a predetermined print area;
   management means for accessing said font memory and retrieving therefrom the dot information corresponding to the character codes and writing the same in said bit map memory when said judging means detects the character codes while accessing said pseudofont memory and retrieving therefrom the dot information corresponding to the series of dot data and writing the same in said bit map memory when said judging means detects the series of dot data; and
   output means for outputting said dot information stored in said bit map memory in a predetermined order.

18. An interface system of claim 17, wherein said font memory stores dot information constituting a virtual matrix having a plurality of rows and columns in accordance with a plurality of characters represented by the character codes.

19. An interface system of claim 17, wherein said font memory is constructed as a detachably attachable ROM cartridge.

20. An interface system of claim 17, wherein said interface system includes a plurality of said font memories in accordance with different types of character fonts.

21. An interface system of claim 17, wherein said pseudofont memory is provided independently of said font memory.

22. An interface system of claim 17, wherein said pseudofont memory stores dot information constituted by column vectors obtained by matrix-transposing row vectors of the series of dot data at a different position within a common storage area storing a plurality of dot information corresponding to the characters stored in said font memory.

23. An interface system of claim 22, wherein in said pseudofont memory said common area comprises a virtual matrix of m rows and n columns storing in a first row thereof the dot information constituted by column vectors obtained by matrix-transposing row vectors of the series of dot data and storing from a second row thereof the dot information corresponding to the characters.

24. An interface system of claim 17, wherein said judging means effects the judgement based on a bit image designating command indicative of a data type and received from the host computer prior to reception of the character codes or of the serial dot data.

25. An interface system of claim 17, wherein said management means includes;
   data read/select means for designating an address in said font memory and retrieving therefrom dot information corresponding to character codes when said judging means detects the character codes while designating an address in said pseudofont memory and retrieving therefrom dot information corresponding to serial dot data when said judging means detects the serial dot data as pseudocharacter codes, and
   layout means for designating a starting address in said bit map memory in accordance with a format of said character codes or said serial dot data and successively writing dot information constituting a virtual matrix read out by said data read/select means.

26. An interface system of claim 25, wherein said data read/select means includes pseudofont memory selecting means for manually or automatically selecting one from a plurality of pseudofont memories in accordance with a type of said serial dot data.

27. An interface system of claim 25, wherein said data read/select means includes font memory selecting means for manually or automatically selecting one from a plurality of font memories of different character fonts.

28. In an interface system for receiving from a host computer a series of character codes and a series of dot data as print information, and converting the received codes and data to dot information and for providing the same to a printing system, said interface system comprising:
   a font memory for storing dot information as dot patterns in accordance with a plurality of characters represented by character codes in advance;
   a pseudofont memory for storing dot information in the form of matrix having column vectors and row vectors thereof multiplied respectively by a predetermined value in advance, said column vectors being obtained by matrix-transposing row vectors of several series of dot data;
   judging means for distinguishing between the character codes and the series of dot data;
   a bit map memory for storing dot information to be printed over a predetermined print area;
   management means for accessing said font memory and retrieving therefrom the dot information corresponding to the character codes and writing the same in said bit map memory when said judging means detects the character codes while accessing said pseudofont memory and retrieving therefrom the dot information corresponding to the series of dot data and writing the same in said bit map memory when said judging means detects the series of dot data; and
   output means for outputting said dot information stored in said bit map memory in a predetermined order.

29. An interface system of claim 28, wherein said pseudofont memory stores column vectors for respectively multiplying by a predetermined value column vectors obtained by matrix-transposing row vectors of the serial dot data in the row and column directions so as to match each other a resolution of graphic image data from the host computer and a resolution of the print system.

30. An interface system of claim 28, wherein said pseudofont memory column vectors obtained by matrix-transposing row vectors of the serial dot data and multiplied or reduced in the row direction and in the column direction independently of each other.

31. A print system having an interface system for receiving from a host computer a series of character codes and a series of dot data as print information, and converting the received codes and data to dot information and for providing the same to a printing system, said print system comprising:
   first memory means for storing dot information as column vectors obtained by matrix-transposing row vectors of several series of dot data in advance;
   second memory means for storing dot information to be printed over a predetermined print area;
   management means for accessing said first memory means to store in said second memory means dot information corresponding to the received dot data;
   output means for outputting said dot information stored at said second memory means in a predetermined order;
   a printer-head control unit for effecting a printing operation based on the dot information outputted from said output means; and
   a recording unit for forming a recording image on a recording medium through said printer-head control unit.

* * * * *